United States Patent
Fly et al.

(10) Patent No.: US 8,371,587 B2
(45) Date of Patent: Feb. 12, 2013

(54) METAL BEAD SEAL FOR FUEL CELL PLATE

(75) Inventors: Gerald W. Fly, Geneseo, NY (US);
Jeffrey A. Rock, Fairport, NY (US);
Scott C. Ofslager, Albion, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 984 days.

(21) Appl. No.: 12/023,376

(22) Filed: Jan. 31, 2008

(65) Prior Publication Data

US 2009/0197147 A1  Aug. 6, 2009

(51) Int. Cl.
*F02F 11/00* (2006.01)

(52) U.S. Cl. .................. 277/594; 277/595

(58) Field of Classification Search ........... 277/594–595
See application file for complete search history.

(56) References Cited

U.S. PATENT DOCUMENTS

| | | | |
|---|---|---|---|
| 3,012,086 A | | 12/1961 | Vahldieck |
| 3,320,092 A | | 5/1967 | Uline |
| 4,203,608 A | * | 5/1980 | Nicholson ............ 277/595 |
| 4,721,315 A | * | 1/1988 | Ueta ..................... 277/593 |
| 4,915,398 A | * | 4/1990 | Kitagawa ............. 277/595 |
| 5,536,024 A | * | 7/1996 | Udagawa ............. 277/595 |
| 5,560,623 A | * | 10/1996 | Yoshino ............... 277/595 |
| 6,099,984 A | | 8/2000 | Rock |
| 6,503,653 B2 | | 1/2003 | Rock |
| 7,000,924 B2 | * | 2/2006 | Hohe et al. ........... 277/593 |
| 2004/0209150 A1 | | 10/2004 | Rock et al. |
| 2005/0064267 A1 | | 3/2005 | Guttermann et al. |
| 2005/0173868 A1 | * | 8/2005 | Hatamura et al. .... 277/593 |
| 2006/0060632 A1 | | 3/2006 | Kleber |
| 2006/0061045 A1 | * | 3/2006 | Burg ..................... 277/593 |
| 2006/0145428 A1 | * | 7/2006 | Dudman ............... 277/626 |
| 2008/0164660 A1 | * | 7/2008 | Yasuda ................. 277/595 |
| 2010/0187771 A1 | * | 7/2010 | Waltenberg et al. .. 277/595 |

FOREIGN PATENT DOCUMENTS

| | | |
|---|---|---|
| CN | 1684294 A | 10/2005 |
| CN | 101093879 A | 12/2007 |
| DE | 10158772 C1 | 6/2003 |
| DE | 203 08 332 U1 | 3/2004 |
| DE | 10328039 A1 | 1/2005 |
| DE | 102 48 531 B4 | 10/2005 |
| EP | 0 408 104 A1 | 1/1991 |
| JP | 62256381 A | 11/1987 |
| JP | 63053858 A | 3/1988 |
| WO | WO 01/48845 A2 | 7/2001 |
| WO | WO 02/069416 A2 | 9/2002 |
| WO | WO 2004/036677 A2 | 4/2004 |
| WO | WO 2004/112178 A2 | 12/2004 |

* cited by examiner

*Primary Examiner* — Vishal Patel
(74) *Attorney, Agent, or Firm* — Fraser Clemens Martin & Miller LLC; J. Douglas Miller

(57) ABSTRACT

A bead seal structure is disclosed for sealing between plates of a fuel cell system, wherein the bead seal structure militates against a leakage of fluids from the fuel cell system and a cost thereof is minimized.

13 Claims, 7 Drawing Sheets

METAL BEAD SEAL FOR FUEL CELL PLATE

FIELD OF THE INVENTION

The invention relates to a fuel cell system and more particularly to a bead seal structure for sealing between plates of the fuel cell system.

BACKGROUND OF THE INVENTION

Fuel cell systems are increasingly being used as a power source in a wide variety of applications. Fuel cell systems have been proposed for use in power consumers such as vehicles as a replacement for internal combustion engines, for example. Such a system is disclosed in commonly owned U.S. patent application Ser. No. 10/418,536, hereby incorporated herein by reference in its entirety. Fuel cells may also be used as stationary electric power plants in buildings and residences, as portable power in video cameras, computers, and the like. Typically, the fuel cells generate electricity used to charge batteries or to provide power for an electric motor.

Fuel cells are electrochemical devices which combine a fuel such as hydrogen and an oxidant such as oxygen to produce electricity. The oxygen is typically supplied by an air stream. The hydrogen and oxygen combine to result in the formation of water. Other fuels can be used such as natural gas, methanol, gasoline, and coal-derived synthetic fuels, for example.

The basic process employed by a fuel cell is efficient, substantially pollution-free, quiet, free from moving parts (other than an air compressor, cooling fans, pumps and actuators), and may be constructed to leave only heat and water as by-products. The term "fuel cell" is typically used to refer to either a single cell or a plurality of cells depending upon the context in which it is used. The plurality of cells is typically bundled together and arranged to form a stack with the plurality of cells commonly arranged in electrical series. Since single fuel cells can be assembled into stacks of varying sizes, systems can be designed to produce a desired energy output level providing flexibility of design for different applications.

Different fuel cell types can be provided such as phosphoric acid, alkaline, molten carbonate, solid oxide, and proton exchange membrane (PEM), for example. The basic components of a PEM-type fuel cell are two electrodes separated by a polymer membrane electrolyte. Each electrode is coated on one side with a thin catalyst layer. The electrodes, catalyst, and membrane together form a membrane electrode assembly (MEA).

In a typical PEM-type fuel cell, the MEA is sandwiched between "anode" and "cathode" diffusion mediums (hereinafter "DM's") or diffusion layers that are formed from a resilient, conductive, and gas permeable material such as carbon fabric or paper. The DM's serve as the primary current collectors for the anode and cathode as well as provide mechanical support for the MEA. The DM's and MEA are pressed between a pair of electronically conductive plates which serve as secondary current collectors for collecting the current from the primary current collectors. The plates conduct current between adjacent cells internally of the stack in the case of bipolar plates and conduct current externally of the stack (in the case of monopolar plates at the end of the stack).

The bipolar plates typically include two thin, facing metal sheets. One of the sheets defines a flow path on one outer surface thereof for delivery of the fuel to the anode of the MEA. An outer surface of the other sheet defines a flow path for the oxidant for delivery to the cathode side of the MEA. When the sheets are joined, the joined surfaces define a flow path for a dielectric cooling fluid. The plates are typically produced from a formable metal that provides suitable strength, electrical conductivity, and corrosion resistance, such as 316L alloy stainless steel for example.

The stack, which can contain more than one hundred plates, is compressed, and the elements held together by bolts through corners of the stack and anchored to frames at the ends of the stack. In order to militate against undesirable leakage of fluids from between the pairs of plates, a seal is often used. The seal is disposed along a peripheral edge of the pairs of plates. Prior art seals have included the use of an elastomeric material. The seals formed by the elastomeric materials have performed adequately for prototyping. However, a cost of the elastomeric materials makes a use thereof undesirable for full scale production. Additional prior art seals have included the use of a metal seal, such as disclosed in published Patent Cooperation Treaty (PCT) Pat. Appl. No. PCT/EP2003/011347, hereby incorporated herein by reference in its entirety.

It would be desirable to produce a bead seal for sealing between plates of a fuel cell system, wherein the bead seal structure militates against a leakage of fluids from the fuel cell system and a cost thereof is minimized.

SUMMARY OF THE INVENTION

Consistent and consonant with the present invention, a bead seal for sealing between plates of a fuel cell system, wherein the bead seal structure militates against a leakage of fluids from the fuel cell system and a cost thereof is minimized, has surprisingly been discovered.

In one embodiment, the bead seal comprises an elongate protuberance formed on a metal sheet, the protuberance including a first lateral side and a spaced apart second lateral side with a substantially arcuate upper sealing surface disposed between the first side and the second side, wherein at least a first radius and a second radius define the first lateral side, at least one radius and a crown width define the upper sealing surface, and at least a first radius and a second radius define the second lateral side.

In another embodiment, a plate with a first surface, a second surface, and an outer peripheral edge; a flow field formed on the first surface of the plate, the flow field including an inlet feed region having a plurality of apertures formed therein and an outlet region having a plurality of apertures formed therein; and a bead seal formed on the plate, the bead seal being an elongate protuberance with a substantially arcuate upper sealing surface adapted to cooperate with an adjacent component to facilitate forming a substantially media tight seal therebetween.

In another embodiment, a fuel cell stack comprises at least one end plate having a peripheral edge, a flow field, an inlet feed region adjacent the flow field, and an outlet region adjacent the flow field and spaced from the inlet feed region; a plurality of fuel cell plates disposed in structural relation with the end plate, wherein each plate includes a peripheral edge and a flow field, the flow field including an inlet feed region having a plurality of apertures formed therein and an outlet region having a plurality of apertures formed therein; a bead seal formed around at least one of the outer peripheral edge of the plate and the apertures formed therein, the bead seal having a substantially arcuate upper sealing surface; and a membrane disposed between each fuel cell plate, the membrane including a sealant material disposed thereon adapted to cooperate with the bead seal to facilitate forming a substantially media tight seal therebetween.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
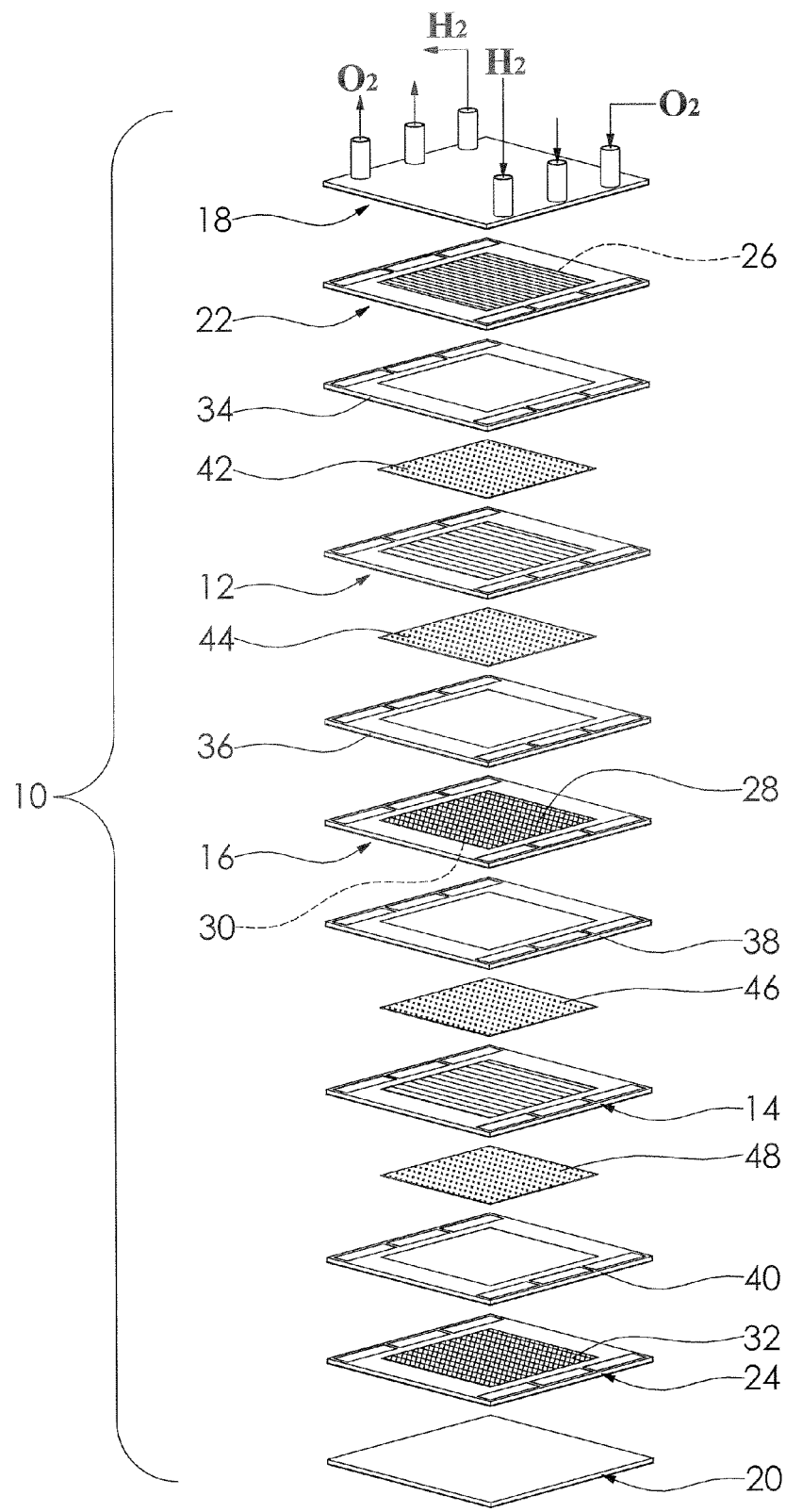
FIG. 1 is an exploded perspective view of a typical fuel cell stack.

FIG. 1 shows a two-cell bipolar PEM fuel cell stack 10. Although a bipolar PEM fuel cell stack is shown, it is understood that other fuel cell types and configurations can be used without departing from the scope and spirit of the invention. It is also understood that fuel cell stacks having more cells and plates can be and typically are used.

The fuel cell stack 10 includes a first membrane-electrode-assembly (MEA) 12 and a second membrane-electrode assembly 14. An electrically conductive, liquid-cooled, bipolar plate 16 is disposed between the first MEA 12 and the second MEA 14. The first MEA 12, the second MEA 14, and the bipolar plate 16 are stacked together between clamping plates 18, 20 and monopolar end plates 22, 24. The clamping plates 18, 20 are electrically insulated from the monopolar end plates 22, 24.

A working face of each of the monopolar end plates 22, 24, as well as both working faces of the bipolar plate 16 include a plurality of grooves or channels 26, 28, 30, 32 formed therein. The channels 26, 28, 30, 32 define a so-called "flow field" for distributing a fuel and an oxidant gas over the faces of the MEA's 12, 14. In the embodiment described herein, the fuel is hydrogen and the oxidant is oxygen, although it is understood that other fuels and oxidants can be used as desired.

Nonconductive gaskets 34, 36, 38, 40 are respectively disposed between the monopolar end plate 22 and the first MEA 12, the first MEA 12 and the bipolar plate 16, the bipolar plate 16 and the second MEA 14, and the second MEA 14 and the monopolar end plate 24. The gaskets 34, 36, 38, 40 provide a seal and electrically insulate the monopolar end plate 22 and the first MEA 12, the first MEA 12 and the bipolar plate 16, the bipolar plate 16 and the second MEA 14, and the second MEA 14 and the monopolar end plate 24.

Gas-permeable diffusion media 42, 44, 46, 48 abut respective electrode faces of the first MEA 12 and the second MEA 14. The diffusion media 42, 44, 46, 48 are respectively disposed between the monopolar end plate 22 and the first MEA 12, the first MEA 12 and the bipolar plate 16, the bipolar plate 16 and the second MEA 14, and the second MEA 14 and the monopolar end plate 24.

The bipolar plate 16 is typically formed from an anode plate (not shown) and a cathode plate (not shown). The anode plate and the cathode plate are bonded together to form a coolant chamber therebetween. The channel 28 is formed in the anode plate and channel 30 is formed in the cathode plate to form the respective flow fields.

Figure 2:
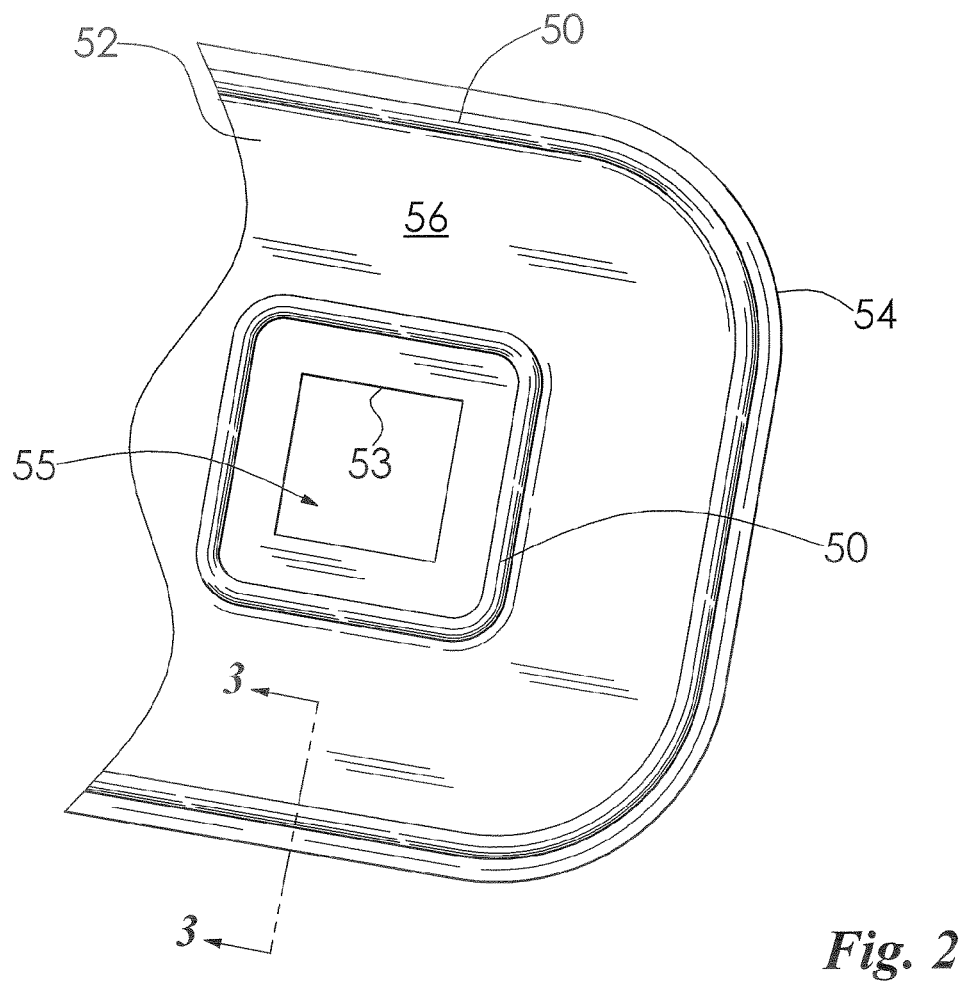
FIG. 2 is a fragmentary perspective view of a metal sheet including a bead seal according to the present invention.

FIG. 2 illustrates a bead seal 50 according to an embodiment of the present invention. The bead seal 50 is typically formed on a planar metal sheet 52 adjacent an outer edge 54 of the sheet 52. Additionally, the bead seal 50 can be disposed adjacent an edge 53 surrounding an aperture 55 formed in the sheet 52. The metal sheet 52 has a first surface 56 and a second surface 58, shown in FIG. 3. Typically, the bead seal 50 is formed in the metal sheet 52 by a stamping operation, although other methods can be used as desired.

Figure 3:
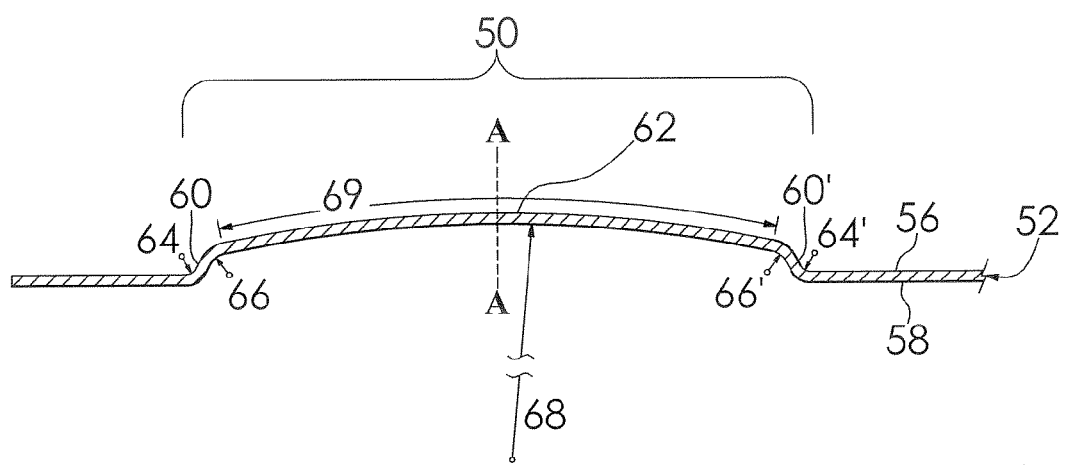
FIG. 3 is a cross sectional view of the bead seal shown in FIG. 2 taken along line 3-3.

FIG. 3 is a cross sectional view of the bead seal 50 shown in FIG. 2. In the embodiment shown, the bead seal 50 is substantially symmetrical about a center line A-A. However, it is understood that non-symmetrical bead seals can be used without departing from the scope and spirit of the invention. The bead seal 50 has a generally arcuate shape. In the embodiment shown, the bead seal 50 is formed from a plurality of radii, integrally connected to form lateral sides 60, 60' and an upper sealing surface 62. The bead seal 50 has at least a first radius 64, 64' respectively transitioning from the first surface 56 of the metal sheet 52 to the sides 60, 60', at least one subsequent radius 66, 66' respectively transitioning from the sides 60, 60' to the upper sealing surface 62, and at least one radius 68 and crown width 69 defining the upper sealing surface 62. It is understood that the upper sealing surface 62 and the sides 60, 60' can be defined by more or fewer radii if desired. Further, it is understood that the sides 60, 60' can include one or more substantially flat portions if desired. The arcuate shape of the bead seal 50 provides an elastic response to a load in a direction normal to the upper sealing surface 62.

Figure 4:
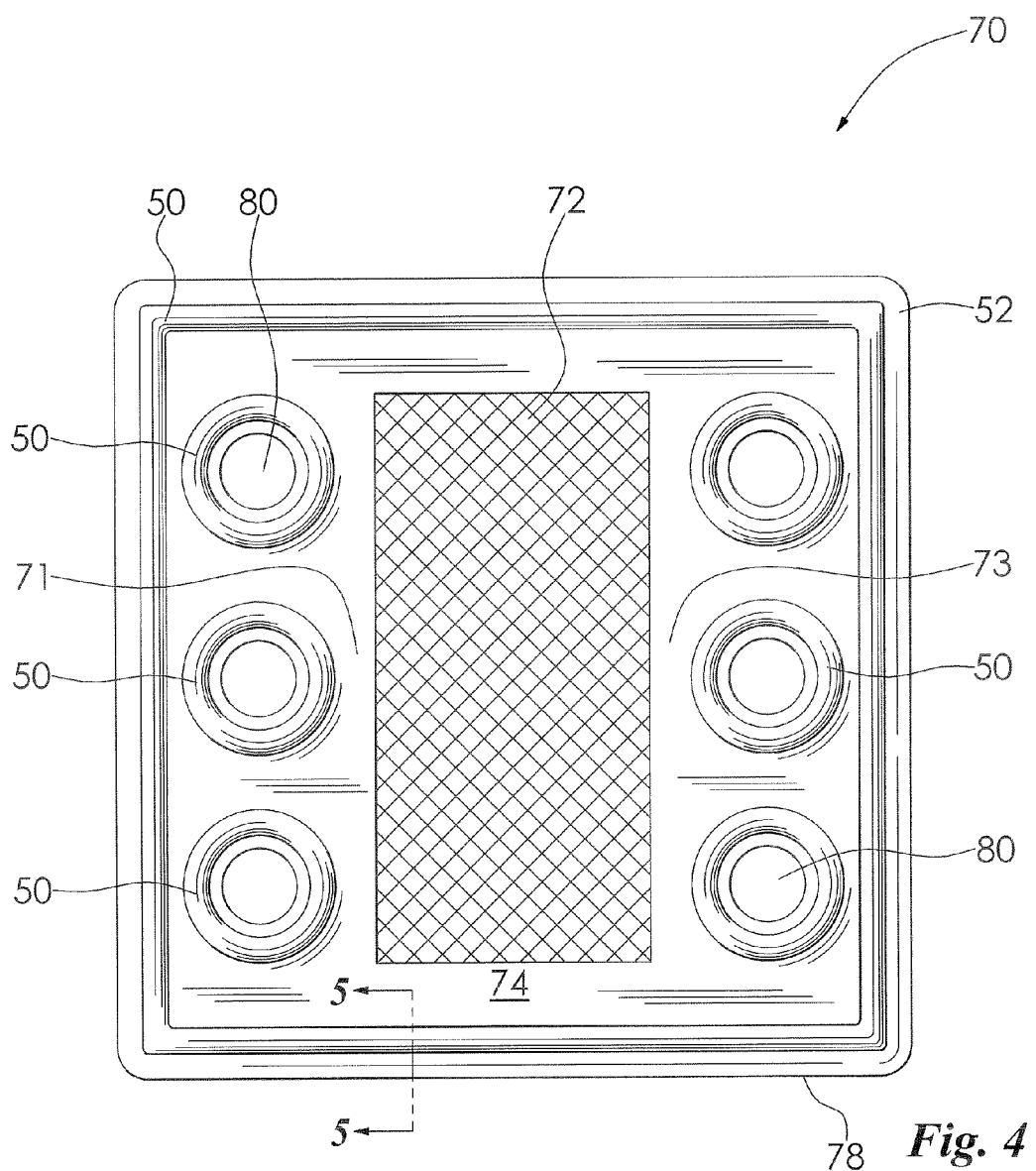
FIG. 4 is a top plan view of a bipolar fuel cell plate including a bipolar bead seal.
Figure 5:
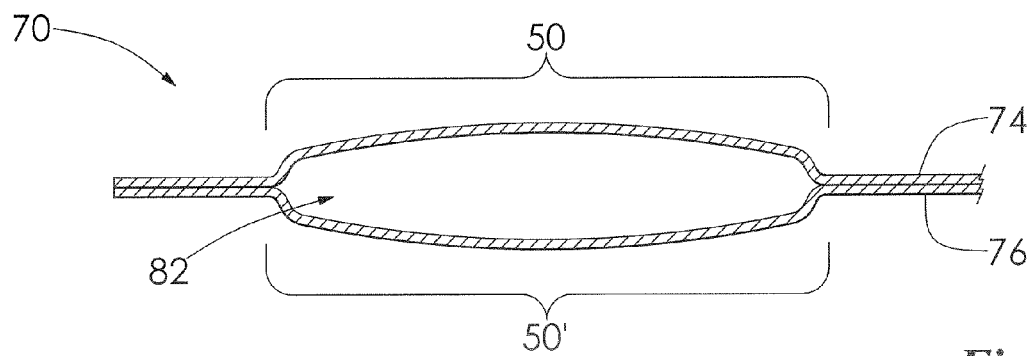
FIG. 5 is a cross sectional view of the bipolar bead seal shown in FIG. 4 taken along line 5-5.

The metal sheet 52 can be adapted to form a gasket or a monopolar plate for a fuel cell. Further, the second surfaces of two monopolar plates can be bonded together to form a bipolar fuel cell plate 70 as shown in FIGS. 4 and 5. The plates can be bonded by various means such as welding or an application of an adhesive, for example. The bipolar plate 70 includes an anode plate 74 and a cathode plate 76 (shown in FIG. 5). A flow field 72 having a plurality of groves or channels (not shown) is formed on an outer surface of each plate 74, 76. The flow field 72 includes an inlet region 71 and outlet region 73, each having a plurality of apertures 80 formed therein. In the embodiment shown, the bead seal 50 is formed on the plate 74 and the bead seal 50' is formed on the plate 76. The bead seals 50, 50' are formed on the bipolar plate 70 adjacent a peripheral edge 78 and surrounding the apertures 80 where a sealing thereof is desired.

FIG. 5 is a cross sectional view of the bead seals 50, 50' of the bipolar fuel cell 70 shown in FIG. 4. The bead seals 50, 50' form a channel 82 therebetween.

Figure 6:
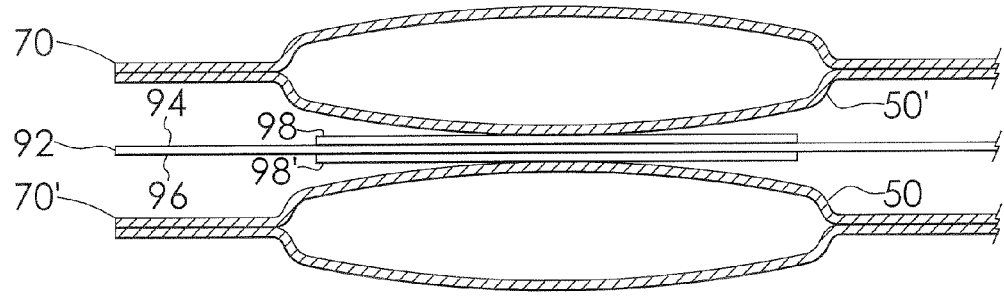
FIG. 6 is a cross sectional view of two adjacent bipolar bead seals with a membrane electrode assembly (MEA) disposed therebetween.

The bipolar fuel cell plate 70 shown in FIG. 4 can be used in a fuel stack assembly (not shown). FIG. 6 shows a cross sectional view of the bead seal of two adjacent bipolar plates 70, 70' in a fuel cell stack assembly. The bipolar plates 70, 70' are stacked in vertical alignment so that the respective bead seals 50, 50' are disposed adjacent one another. The apertures 80 of the plates 70 are substantially aligned in the fuel cell stack assembly to form an inlet manifold (not shown), an outlet manifold (not shown), and a coolant manifold (not shown). An MEA 92 is disposed between and separates the anode and cathode sides of the adjacent bipolar plates 70, 70'. The MEA 92 is secured within the fuel cell stack 10 by a contact force between adjacent bead seals 50, 50'. A micro-seal 98 is disposed on a flat upper surface 94 and a flat lower surface 96 of the MEA 92 adjacent to the bead seals 50, 50' of the bipolar plates 90, 90'. The micro-seal 98 is adhered to each surface 94, 96 of the MEA 92 prior to an assembly of the fuel stack 10. The micro-seal 98 can be applied to the MEA 92 using a printing means or other method of application as desired. A material of the micro-seal 98 can be any conventional material such as an elastomer, for example, or other material that provides the desired sealing properties. It is understood that the micro-seal 98 can be applied to only one of the surfaces 94, 96 if desired.

The fuel cell stack 10 typically includes a plurality of bipolar plates stacked in vertical alignment like the bipolar plates 70 shown in FIG. 6. Clamping plates 18, 20 are typically provided at each end of the fuel cell stack as illustrated in FIG. 1. The clamping plates 18, 20 are adapted to provide a compressive force on the fuel cell stack 10. The compressive force causes compression of the fuel cell stack 10, and consequently, the bead seals 50, 50'. The compression results in a contact force between bead seals 50, 50' of adjacent bipolar plates 70 to form a substantially fluid tight seal therebetween.

The resilient structure of the bead seals 50 militates against concentrated contact pressures at the sealing surface 62 when under a compressive force from the clamping plates 18, 20. A typical flat bead seal of the prior art (not shown) has a substantially fixed sealing surface contact area. With such a design, the contact pressure between adjacent flat bead seals increases linearly as the applied clamping force is increased. The arcuate shape of the sealing surface 62 provides for an increase in contact area at the sealing surface 62 as the clamping force on the fuel cell stack 10 is increased and the bead seals 50 deflect. The increasing contact area between adjacent sealing surfaces minimizes the rate of increase in contact pressures and provides a more uniform distribution of the contact pressure as compared to the typical flat bead seal.

The uniform contact pressure militates against damaging components that are placed between the adjacent bead seals 50 such as, for example, the MEA 92 and the micro-seal 98 as illustrated in FIG. 6. The flat bead seal from the prior art can pinch and damage the components at areas of concentrated contact pressures. The components must be of a sufficient thickness to militate against such damage. The use of the bead seals 50 militates against damaging the components and facilitates a use of thinner components.

Stiffness and resiliency of the bead seals 50 is also maximized and can be varied. The radii and crown width defining the bead seal can be adjusted to achieve a desired level of stiffness and resiliency. Favorable results for the bead seal of the present invention have been found using radii for the first side 60 and the second side 60' between about 0.1 millimeters to 0.5 millimeters, the radius 68 for the upper sealing surface 62 between about 2.0 millimeters to 100.0 millimeters, and the crown width 69 for the upper sealing surface 62 between about 0.5 millimeters to 5.0 millimeters. Further, when two plates 74, 76 are bonded together to form the bipolar plate 70 shown in FIG. 4, the resiliency of the bead seal 50 can be altered by varying the location at which the two plates 74, 76 are bonded. A relative movement between the two plates 74, 76 is constrained by the bonds. A spacing of the bonds from the bead seal 50 modifies the resiliency of the bead seal 50. Thus, bond locations can be selected to fine tune the resiliency of the bead seal 50.

The resiliency of the bead seals 50 is maximized. An elastic response of a typical bead seal is approximately 1 to 2% while the elastic response of the bead seal 50 of the present invention can be as great as 60% or more. In a fuel cell stack, the wide range of operating temperatures and the compression set of the components, such as the MEA 92, may cause a height of the stack to vary by an amount greater than 1 or 2%. The typical bead seal cannot accommodate the changes in the stack height and is prone to leaking when the fuel cell is operating at low temperatures, for example. Further, during operation, the MEA 92 of the fuel cell may swell due to a humidification thereof. The typical bead seal with limited elastic response cannot accommodate the swelling of the MEA 92, causing the contact force between the MEA 92 and the bead seal to increase, potentially damaging the MEA 92. The increased resiliency of the bead seal of the present invention militates against leaks between adjacent bead seals at low temperatures and damage to the MEA 92 during typical operating conditions.

The resilient nature of the bead seal of the present invention also optimizes the disassembly and rebuilding process of the fuel cell stack. For example, the fuel cell plates utilizing the bead seal 50 can be reused since plastic deformation of the bead seal 50 is minimized. The fuel cell stack 10 can be disassembled; components of the fuel cell stack 10, such as the MEA 92 and micro-seal 98, can be replaced; and the fuel cell can then be reassembled with the original plates. The resilient nature of the bead seal 50 allows the seal between adjacent bead seals 50, 50' to be reestablished while substantially maintaining the original fuel cell stack height.

The bipolar plate in a fuel cell is typically formed from an anode plate and a cathode plate. The anode plate and the cathode plate may be bonded together to form a coolant chamber therebetween. Coolant is passed through the coolant chamber to maintain the fuel cell at a desired operating temperature. For example, the channel 82 formed between the bead seals 50, 50' can be utilized as a path for coolant to flow between the anode plate 74 and the cathode plate 76. The location and amount of coolant in the coolant chamber can be controlled by selectively blocking or restricting the channels 82, allowing only the needed amount of coolant to flow therethrough to maintain the desired operating temperature of the fuel cell stack 10. The channel 82 can also be used as a flow path for other media such as the fuel or the oxidant for the fuel cell.

A gasket (not shown) or fuel cell plate 70 featuring the bead seal of the present invention can be manufactured at a reduced cost compared to a gasket or fuel cell plate employing a typical prior art bead seal. The bead seal 50, for example, does not require additional surface finish treatment such as applying a sealing material to the sealing surface 62, for example. The cost of manufacturing gaskets and fuel cell plates is minimized by incorporating the bead seal 50 and eliminating the manufacturing step that applies a sealant to a bead seal.

The elimination of the sealant material from the bead seal 50 also reduces the complexity of rebuilding a fuel cell stack compared with a typical prior art fuel cell stack. Repair of fuel cell plates incorporating the bead seal 50 during a fuel cell stack rebuild is minimized. A new micro-seal 98 is provided with the replacement of the components. The inspection and repair of the sealant material on the bead seal 50 is minimized during the fuel cell stack rebuilding process.

Further, fuel cell plates incorporating the bead seal 50 of the present invention and the MEA 92 with the micro-seal 98 disposed on each side can eliminate the non-conductive gaskets 34, 36, 38, 40 used in a typical fuel cell stack as shown in FIG. 1. The materials and assembly cost of manufacturing such a fuel cell is minimized by eliminating the non-conductive gaskets 34, 36, 38, 40.

Figure 3A:
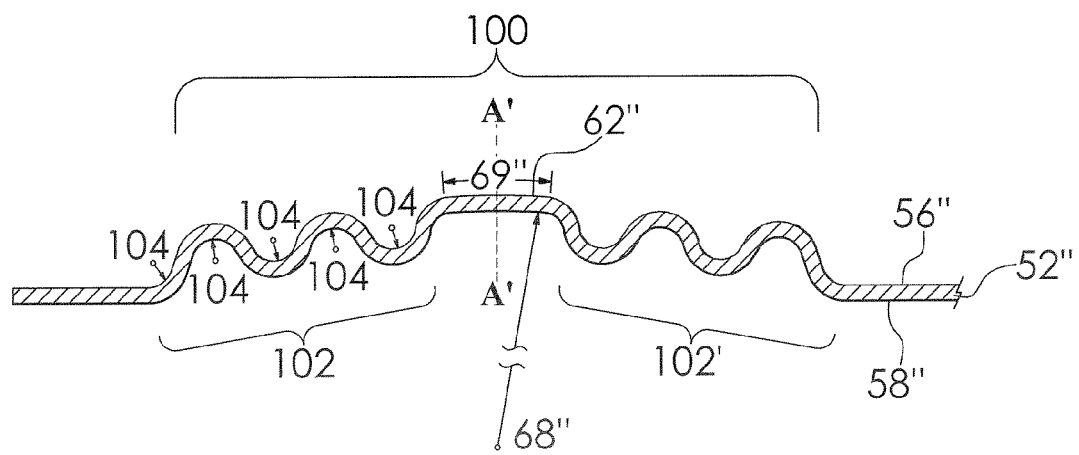
FIG. 3a is a cross sectional view of a bead seal according to another embodiment of the invention.

FIG. 3a is a cross sectional view of an alternate embodiment of the invention. Like structure repeated from FIG. 3 includes the same reference numeral and a double prime symbol ("). FIG. 3a illustrates a bead seal 100 substantially symmetric about a center line. The bead seal 100 is formed from a plurality of radii 104, integrally connected to form serpentine sides 102, 102' and an arcuate upper sealing surface 62". The serpentine sides 102, 102' transition from the first surface 56" of the metal sheet 52" to the upper sealing surface 62". The serpentine sides 102, 102' cooperate with the arcuate shape of the sealing surface 62" to provide an elastic response to a load in a direction normal to the sealing surface 62". It is understood that serpentine sides 102, 102' can have a different length and quantity of included radii than illustrated to obtain a desired elastic response for the bead seal 100. Additionally, the upper sealing surface 62" can have other radii 68" and crown widths 69" to obtain the desired elastic response for the bead seal 100. Further, it is understood that a variety of radii can be used to define any one serpentine side 102, 102', flat portions can be included in the serpentine sides 102, 102' and other shapes can be used for the serpentine sides 102, 102'. The remaining structure and use is the same as described above for the embodiment shown in FIG. 3.

Figure 3B:
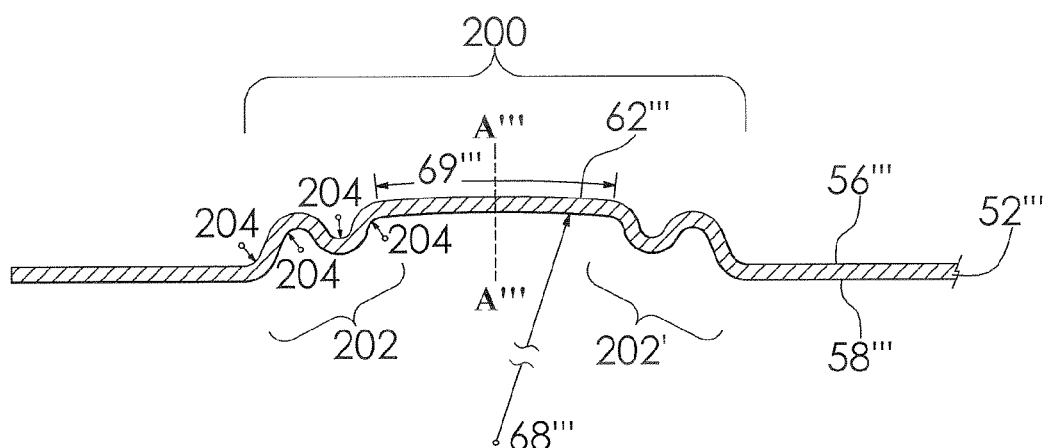
FIG. 3b is a cross sectional view of a bead seal according to another embodiment of the invention.

FIG. 3b is a cross sectional view of an alternate embodiment of the invention. Like structure repeated from FIG. 3 includes the same reference numeral and a triple prime symbol ("'). FIG. 3b illustrates a bead seal 200 substantially symmetric about a center line. The bead seal 200 is formed from a plurality of radii 204, integrally connected to form serpentine sides 202, 202' and an arcuate upper sealing surface 62'''. The serpentine sides 202, 202' transition from the first surface 56''' of the metal sheet 52''' to the upper sealing surface 62'''. The serpentine sides 202, 202' cooperate with the arcuate shape of the sealing surface 62''' to provide an elastic response to a load in a direction normal to the sealing surface 62'''. It is understood that serpentine sides 202, 202' can have a different length and quantity of included radii than illustrated to obtain a desired elastic response for the bead seal 200. Additionally, the upper sealing surface 62''' can have other radii 68" and crown widths 69''' to obtain the desired elastic response for the bead seal 200. Further, it is understood that a variety of radii can be used to define any one serpentine side 202, 202', flat portions can be included in the serpentine sides 202, 202' and other shapes can be used for the serpentine sides 202, 202'. The remaining structure and use is the same as described above for the embodiment shown in FIG. 3.

Figure 5A:
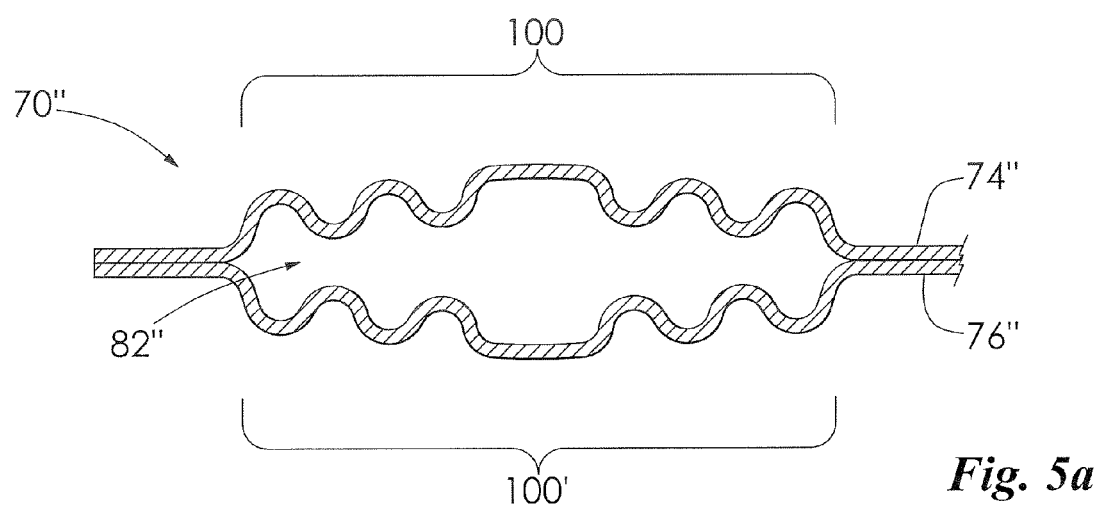
FIG. 5a is a cross sectional view of a bipolar bead seal according to another embodiment of the invention.

FIG. 5a is a cross sectional view of an alternative embodiment of the bipolar fuel cell plate 70 shown in FIG. 5. Like structure repeated from FIG. 5 includes the same reference numeral and a double prime symbol ("). 5a. FIG. 5a shows the bipolar plate 70" with the bead seals 100 shown in FIG. 3a. employed to form the bipolar bead seal 100, 100'. The bead seals 100, 100' form a channel 82" therebetween. The remaining structure and use is the same as described above for the embodiment shown in FIG. 5.

Figure 5B:
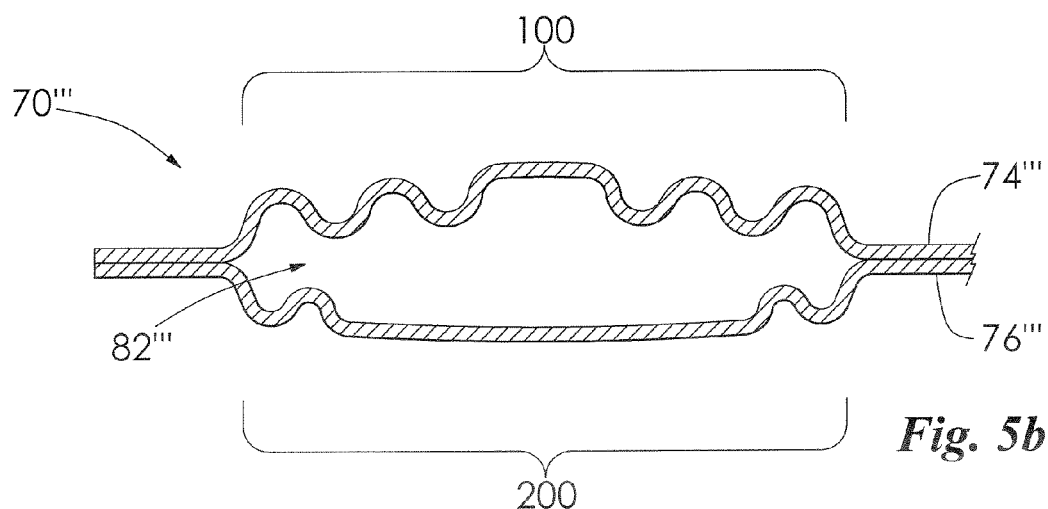
FIG. 5b is a cross sectional view of a bipolar bead seal according to another embodiment of the invention.

FIG. 5b is a cross sectional view of an alternative embodiment of the bipolar fuel cell plate 70 shown in FIG. 5. Like structure repeated from FIG. 5 includes the same reference numeral and a triple prime symbol ("'). In FIG. 5b, different bead seal shapes are used for the anode side 74''' and cathode side 76''' respectively. The bead seal 100 of FIG. 3a is used for the anode side 74''' and the bead seal 200 of FIG. 3b is used for the cathode side 76'''. It is understood that other bead seal shapes can be used for the anode side 74''' and the cathode side 76''' of the bipolar fuel cell 70'''. The bead seals 100, 200 form a channel 82" therebetween. The remaining structure and use is the same as described above for the embodiment shown in FIG. 5.

Figure 6A:
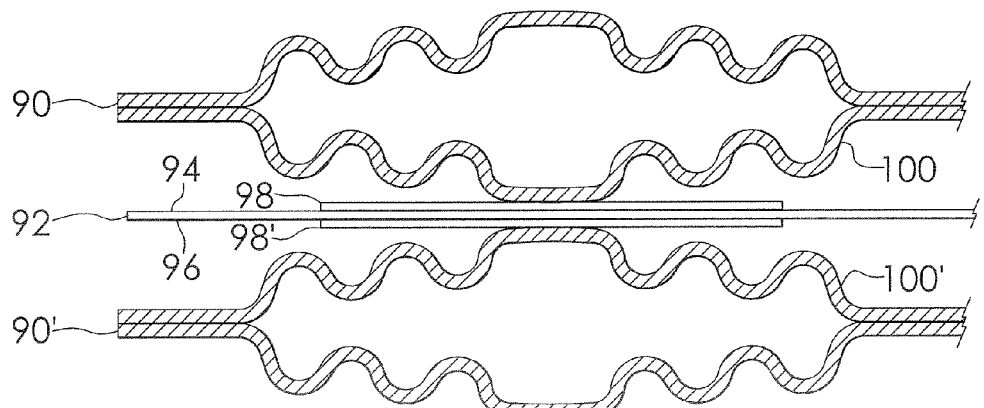
FIG. 6a is a cross sectional view of two adjacent bipolar bead seals with a membrane electrode assembly (MEA) disposed therebetween according to another embodiment of the invention.

FIG. 6a shows a cross sectional view of two adjacent bipolar plates 90, 90' in a fuel cell stack having the bead seal 100 illustrated in FIG. 5a.

Figure 6B:
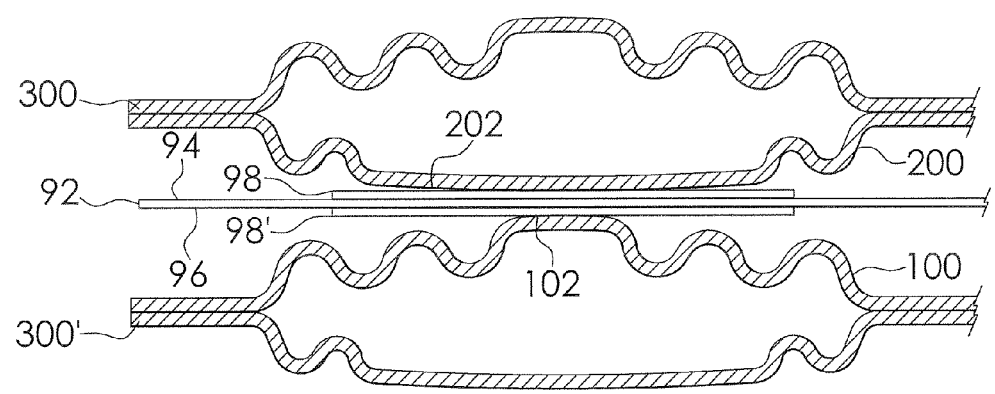
FIG. 6b is a cross sectional view of two adjacent bipolar bead seals with a membrane electrode assembly (MEA) disposed therebetween according to another embodiment of the invention.

FIG. 6b shows a cross sectional view of two adjacent bipolar plates 300, 300' in a fuel cell stack having the bead seals 100, 200 illustrated in FIG. 5b. The bead seals 100, 200 in the bipolar plates 300, 300' militate against a lateral misalignment causing a reduction in the effectiveness of the seal between adjacent bipolar plates 300, 300'. The bipolar plates 300, 300' can have some degree of a lateral misalignment due to manufacturing variation. The sealing surface 202 of bead seal 200 is wider than the sealing surface 102 of bead seal 100. The sealing surface 202 of bead seal 200 does not require exact vertical alignment with the adjacent sealing surface 102 of bead seal 100 to form a maximized seal therewith. The bead seals 200, 100 can form a sufficient seal therebetween within a range of lateral alignment. It is understood the range of allowable misalignment can be adjusted as desired by changing the respective bead seal shapes.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A bead seal comprising:
an out-of-plane elongate protuberance formed on a planar metal sheet, the protuberance including a first lateral side and a spaced apart second lateral side with a substantially arcuate upper sealing surface disposed between the first lateral side and the second lateral side, wherein at least a first radius transitions from the planar metal sheet to the first lateral side and a second radius transitions from the first lateral side to the substantially arcuate upper sealing surface, at least one radius and a crown width define the substantially arcuate upper sealing surface, and at least a first radius transitions from the planar metal sheet to the second lateral side and a second radius transitions from the second lateral side to the substantially arcuate upper sealing surface, wherein the at least one radius of the substantially arcuate upper sealing surface curves outward in a first direction away from a plane of the planar metal sheet and at least one of the second radii curves outward in the first direction away from the plane of the planar metal sheet and towards the substantially arcuate upper sealing surface, and wherein the at least one radius of the substantially arcuate upper sealing surface is greater than the second radii, and wherein a range of the radii of the first lateral side and the second lateral side is between about 0.1 millimeters to 0.5 millimeters, a range of the at least one radius of the substantially arcuate upper sealing surface is between about 2.0 millimeters to 100 millimeters, and a range of the crown width of the substantially arcuate upper sealing surface is between about 0.5 millimeters to 5.0 millimeters.

2. The bead seal according to claim 1 wherein the bead seal is symmetrical about a longitudinal axis thereof.

3. The bead seal according to claim 1 wherein the first lateral side and second lateral side include at least one flat portion formed therein.

4. The bead seal according to claim 1 wherein the first lateral side and second lateral side include a plurality of radii connected to form serpentine sides.

5. A plate for a fuel cell comprising:
a planar plate with a first surface, a second surface, and an outer peripheral edge;
a flow field formed on the first surface of the planar plate, the flow field including an inlet feed region having a plurality of apertures formed therein and an outlet region having a plurality of apertures formed therein; and
an out-of-plane bead seal formed on the planar plate, the out-of-plane bead seal being an elongate protuberance including a first lateral side and a spaced apart second lateral side with a substantially arcuate upper sealing surface disposed between the first lateral side and the second lateral side, wherein at least a first radius transitions from the planar plate to the first lateral side and a second radius transitions from the first lateral side to the substantially arcuate upper sealing surface, at least one radius and a crown width define the substantially arcuate upper sealing surface, and at least a first radius transitions from the planar plate to the second lateral side and a second radius transitions from the second lateral side to the substantially arcuate upper sealing surface, wherein the at least one radius of the substantially arcuate upper sealing surface curves outward in a first direction away from a plane of the planar plate and at least one of the second radii curves outward in the first direction away from the plane of the planar plate and towards the substantially arcuate upper sealing surface, and wherein the at least one radius of the substantially arcuate upper sealing surface is greater than the second radii, and wherein a range of the radii of the first lateral side and the second lateral side is between about 0.1 millimeters to 0.5 millimeters, a range of the at least one radius of the substantially arcuate upper sealing surface is between about 2.0 millimeters to 100 millimeters, and a range of the crown width of the substantially arcuate upper sealing surface is between about 0.5 millimeters to 5.0 millimeters.

6. The plate according to claim 5 wherein the out-of-plane bead seal includes at least one flat portion formed in the first lateral side and at least one flat portion formed in the second lateral side.

7. The plate according to claim 5 wherein the out-of-plane bead seal includes a plurality of radii connected to form a serpentine first lateral side and a serpentine second lateral side.

8. A fuel cell stack comprising:
at least one end plate having a peripheral edge, a flow field, an inlet feed region adjacent the flow field, and an outlet region adjacent the flow field and spaced from the inlet feed region;
at least one planar bipolar plate disposed adjacent the end plate, wherein each planar bipolar plate includes a flow field formed on at least one of a first surface and a second surface, the flow field including an inlet feed region having a plurality of apertures formed therein and an outlet region having a plurality of apertures formed therein; and
an out-of-plane bead seal formed around at least one of an outer peripheral edge of the at least one planar bipolar plate and the apertures formed therein, the out-of-plane bead seal being an elongate protuberance including a first lateral side and a spaced apart second lateral side with a substantially arcuate upper sealing surface disposed between the first lateral side and the second lateral side, wherein at least a first radius transitions from the at least one planar bipolar plate to the first lateral side and a second radius transitions from the first lateral side to the substantially arcuate upper sealing surface, at least one radius and a crown width define the substantially arcuate upper sealing surface, and at least a first radius transitions from the at least one planar bipolar plate to the second lateral side and a second radius transitions from the second lateral side to the substantially arcuate upper sealing surface, wherein the at least one radius of the substantially arcuate upper sealing surface curves outward in a first direction away from a plane of the at least one planar bipolar plate and at least one of the second radii curves outward in the first direction away from the plane of the at least one planar bipolar plate and towards the substantially arcuate upper sealing surface, and wherein the at least one radius of the substantially arcuate upper sealing surface is greater than the second radii, and wherein a range of the radii of the first lateral side and the second lateral side is between about 0.1 millimeters to 0.5 millimeters, a range of the at least one radius of the substantially arcuate upper sealing surface is between about 2.0 millimeters to 100 millimeters, and a range of the crown width of the substantially arcuate upper sealing surface is between about 0.5 millimeters to 5.0 millimeters.

9. The fuel cell stack according to claim 8 further comprising a membrane disposed between each plate, the membrane including a sealant material disposed thereon adapted to cooperate with the out-of-plane bead seal to facilitate forming a substantially media tight seal therebetween.

10. The fuel cell stack according to claim 9 wherein the sealant material is applied to the membrane using a printing means.

11. The fuel cell stack according to claim 9 wherein the sealant material includes an elastomeric material.

12. The fuel cell stack according to claim 8 wherein the out-of-plane bead seal includes at least one flat portion formed in the first lateral side and at least one flat portion formed in the second lateral side.

13. The fuel cell stack according to claim 8 wherein the out-of-plane bead seal includes a plurality of radii connected to form a serpentine first lateral side and a serpentine second lateral side.

* * * * *